May 19, 1936. N. B. MILLER 2,041,565

PACKING

Filed Feb. 20, 1934

INVENTOR
Norman B. Miller
BY
ATTORNEY

Patented May 19, 1936

2,041,565

UNITED STATES PATENT OFFICE 2,041,565

PACKING

Norman B. Miller, New York, N. Y.

Application February 20, 1934, Serial No. 712,214

4 Claims. (Cl. 154—45.5)

This invention relates to an improvement in packings, and particularly to an improvement in packings designed for use in the stuffing boxes of piston rods, plungers, and the like.

An object of the invention is to provide a packing which may be easily and cheaply manufactured and which will be durable and more effective than packings of its general type as heretofore used.

A further object is to provide a packing which is substantially square in cross section, so that it will be best adapted for economical use in stuffing boxes, and which is more efficient than square packings as heretofore produced.

A further object is to provide a square packing of the type indicated having component layers arranged to stand at an angle to the surface of the shaft or plunger and in which an appreciable group of said layers will be continuous from the inner or shaft engaging surface of the packing to the outer or stuffing box engaging surface of the packing.

A further object is to provide a packing of the type indicated made up of alternate layers of canvas and rubber-like material arranged at an angle with respect to the square cross sectional contour of the packing, and to so design the packing as to provide requisite strength in certain of the corner portions of said packing.

A further object is to provide a packing of the type indicated of such construction that when in use certain integral portions thereof will be adapted for a wedge like movement, under gland pressure and under pressure of steam or the like, into tighter engagement with the shaft, while other portions will serve to facilitate this movement, and to at the same time provide a tight engagement with the shaft.

Other objects and aims of the invention, more or less specific than those referred to above, will be in part obvious and in part pointed out in the course of the following description of the elements, combinations, arrangements of parts and applications of principles constituting the invention; and the scope of protection contemplated will be indicated in the appended claims.

In the accompanying drawing which is to be taken as a part of this specification, and in which I have shown merely a preferred form of embodiment of the invention:—

Figure 1:
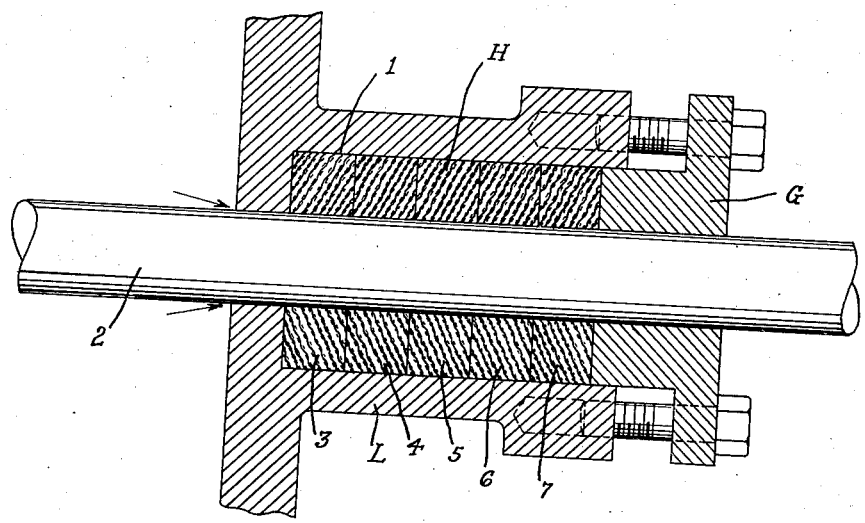
Fig. 1 is a transverse sectional view through a stuffing box showing a series of layers of packing therein constructed in accordance with this invention.
Figure 2:
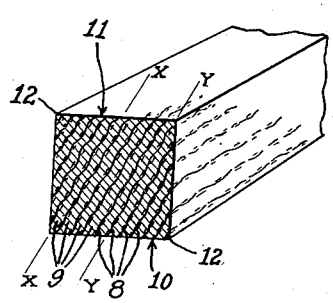
Fig. 2 is a transverse sectional view, partly in perspective, of a piece of packing constructed in accordance with this invention.

Referring to the drawing for describing in detail the structure which is illustrated therein, and referring first to the structure Figs. 1 and 2, the reference character L indicates an ordinary stuffing box having a seat or recess l therein closed by the usual gland G, said seat serving to accommodate the packing, indicated generally by the reference character H.

The shaft 2 passes through the stuffing box and the packing H fits closely thereto in the customary manner.

The packing H as illustrated in Fig. 1 is made up from a strip of material constructed as seen in Fig. 2, and there may be as many layers or convolutions, as 3, 4, 5, 6 and 7, of the strip within the box, as may be desired, according to the length of the box.

The manner of constructing the strip in accordance with this invention is clearly illustrated in Fig. 2. The strip as seen in Fig. 2 is of laminated construction, being made up of alternate layers of relatively stiff material 8, such as canvas or the like, and relatively resilient material 9, such as rubber, or rubber composition.

The material 8 may be either a close woven or a loose woven fabric. It may be either of wire, cotton, asbestos or other suitable like material, or it may be of sheet metal or other appropriate material, perforated or otherwise, or it may in fact be of any material suitable to form layers relatively stiffer than the intervening layers of material 9.

The material 9 may be of any composition of rubber, or the like, and it is preferably of such consistency that it adheres to the material 8 and binds the whole into a heterogeneous mass.

A structure in which the material 8 consists of canvas, and the material 9 consists of rubber vulcanized into and between the layers of canvas so that it holds the layers connected together and at the same time spaced apart, provides a very desirable and effective result.

The method of manufacturing this packing consists merely in spreading a plurality of sheets of the material 9 on top of each other, with intervening layers of the material 8, and of then cutting up this pile into strips having the cross sectional shape and relation of layers, as indicated in Fig. 2.

As clearly illustrated the strips are so cut that the layers, or laminations, stand in angular disposition within the cross sectional square contour of the strip and it is essential here to note that the angular disposition is such that those layers lying in the region as indicated by the lines X—X and Y—Y extend continuously through the packing from the inner or shaft engaging surface 10 of the packing to the outer or stuffing box engaging surface 11 of the packing, while those layers lying outside of said lines X and Y, and completing the corner portions of the packing, are successively shorter, decreasing in length outwardly to the extreme corners as at 12—12.

The cross sectional contour of the strip is substantially exactly square, and this is for various reasons of practicability and economy in fitting the packing into stuffing boxes of different depths, the advantage of which is so well known to those acquainted with this art as to require no specific reference here.

Packing of this type as heretofore constructed has had its laminæ arranged at substantially exactly 45° cater-cornered through the packing so that only a single lamination or layer, at 8 or 9, is of full length extending from the surface 10 entirely through the packing to the surface 11, such a single layer being negligible as a continuous stiffening element between said surfaces.

According to the present invention it is proposed that the laminæ be arranged at an angle of something less than 45° from the vertical, with respect to the axis of the shaft, and it has been found in practice that a packing of this type having its laminæ thus at an angle less than 45° possesses certain important characteristics of improvement in operating efficiency which define a noteworthy improvement in the art.

Amongst these advantages may be mentioned that it provides for a plurality of continuous laminæ, as for instance those indicated between the lines X—X and Y—Y in Fig. 2, all of which laminæ it will be seen extend entirely through the body from the surface 10 to the surface 11.

These continuous laminæ, considered as a group, constitute a relatively firm and stiff section of a thickness X—Y and continuous from surface 10 to 11, said section X—Y inclining at a plus 45° angle from the surface of the shaft.

The steep angle relationship between the section X—Y and the surface of the shaft renders said section more easily wedged into greater steepness against the shaft by a given amount of gland pressure or steam pressure than would be the case if the laminæ of the packing were at a 45° angle.

A closer fit for the packing against the shaft in use is thus provided for.

Also, the group of full length laminæ X—Y diagonally through the center of the strip, by reason of the stiffness which it possesses as a group or section, is not liable to buckle between the surfaces 10 and 11 in use. It also reinforces and holds against buckling the laminæ lying outside the lines X—Y, and constitutes in fact a sort of back-bone from which the remainder of the strip receives strength and stiffness.

Also, the laminæ of the strip lying outside the section X—Y and filling out the square corners of the strip between the section X—Y and the extreme corners 12—12 of the strip, being in the same angular relationship to the shaft as the laminæ comprising the section X—Y, it will be apparent that these corner forming laminæ, particularly those at and near to the extreme corners 12—12, are somewhat longer from surface to surface of the strip than would be the case if the laminæ stood at a 45° angle, and that thereby said laminæ add relatively greater strength and stiffness to the corner portions of the strip than would be the case if said laminæ were at a 45° angle. This is important as giving to the corner portions of the strip outside the section X—Y greater resistance against breaking down in use, and this of course adds to the durability and life of the packing.

In use the packing constructed as above described is arranged within the stuffing box as seen in Fig. 1, care being taken to so place the same that the laminæ thereof diverge from the shaft in the manner as indicated. Steam or other pressure attempting to pass outwardly through the stuffing box, that is in the direction as indicated by the arrows in Fig. 1, and endeavoring to pass between the packing and the shaft, and supplemented by the gland pressure, will cause the diverging laminæ, and particularly the sections X—Y of the several layers, to swing longitudinally outwardly and radially inwardly of the box so that the inner surface portions 10 of the packing is made to wedge against the shaft with the outer surface portions 11 impinging against the inner annular surface of the box, the outer ends or edges of the respective laminæ having in effect a pivotal engagement against the surface of the box, the inner ends of the laminæ swinging relatively about said pivots, and firmly against the shaft.

The material constituting the layers 9—9 is sufficiently resilient and elastic to permit the required amount of sliding movement of the laminæ with respect to each other.

It will be apparent that since the laminæ in sections X—Y are normally more nearly the vertical than the horizontal, it follows that a less amount of steam or gland pressure, as above mentioned, will be required to move them in a given degree closer to the vertical, and into tighter wedge engagement with the shaft, than would be the case if said laminæ were normally at 45° from the vertical.

Due to the fact that the corner forming laminæ that is those laminæ between the lines X—Y and the extreme corners 12 of the strip, do not extend continuously between the inner and outer surfaces of the strip they facilitate movement of the laminæ in section X—Y as set forth. When a series of layers as 3, 4, 5, 6 and 7 are positioned within a stuffing box the corner forming laminæ of adjacent layers throughout constitute groups of relatively broken laminæ of different lengths capable of moving more freely relative to each other than are the laminæ of the intermediate groups or sections X—Y.

Thus it will be seen that in the length of the stuffing box there occurs alternate groups of broken and unbroken laminæ, the former being relatively easily movable with respect to each other to facilitate the movement of the latter, and the movement of the latter operating always to squeeze the former from between the latter and against the shaft.

The normal near-vertical angle of the unbroken laminæ makes the squeezing of the broken laminæ toward the shaft more readily accomplished than if the laminæ were at a 45° angle.

Figure 3:
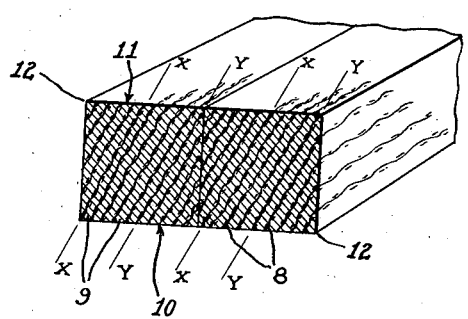
Fig. 3 is a view similar to Fig. 2 but illustrating a modification.

As illustrated in Fig. 3 this invention comprehends that if desired two or more layers of the packing strip Fig. 2 may be connected together for handling as a single strip.

As many changes could be made in this construction without departing from the scope of the invention as defined in the following claims, it is intended that all matter contained in the above description, or shown in the accompanying drawing, shall be interpreted as illustrative only and not in a limiting sense.

Having thus described my invention, what I claim as new and desire to secure by Letters Patent is:—

1. A packing comprising a body which is square in cross section and which is made up throughout of alternate layers of relatively stiff and relatively resilient material, said layers extending obliquely through the body and consisting of an intermediate group and opposite corner-forming groups, the intermediate group being of a thickness not less than ¼ the thickness of the body and its layers being of a length extending uninterruptedly through the body from the inner to the outer surface of the body, and the layers of the corner-forming groups being of successively decreasing length to opposite corners of the body.

2. A packing made up in strip form of square cross-section and adapted to be placed in a stuffing box so that a plurality of layers of the strip lie side by side to fill the box in the usual manner, and said strip being made up of an intermediate group of unbroken laminæ which extend edge-wise substantially through the entire thickness of the strip from the inner to the outer surface thereof and opposite groups of corner-forming laminæ which are of successively decreasing sizes, whereby when said strip is in position filling the stuffing box the several layers of the strip co-operate to provide throughout the length of the box alternate groups of broken and unbroken laminæ in engagement with the shaft at the inner surface of the groups and in engagement with the inner surface of the box at the outer surface of the groups, and all said groups being of approximately equal thickness lengthwise of the box.

3. A packing made up in strip form of square cross-section and adapted to be placed in a stuffing box so that a plurality of layers of the packing lie side by side to fill the box with the inner surface of the strip engaging the shaft, and said strip being made up of alternate layers of relatively stiff and relatively less stiff material all of which layers are arranged to stand at a plus 45° angle relative to the shaft engaging surface of the strip.

4. A packing made up in strip form of square cross-section and adapted to be placed in a stuffing box so that a plurality of layers or sections of the packing lie side by side to fill the box with the inner surface of the strip engaging the shaft, and said strip consisting of an intermediate group of laminæ and opposite groups of corner forming laminæ, the laminæ of the intermediate group being movable with respect to each other and being alternately relatively stiff and less stiff and all being continuous from the inner to the outer surface of the strip, and all of said laminæ being arranged to stand at a plus 45° angle relative to the inner surface of the strip.

NORMAN B. MILLER.